United States Patent

[11] 3,540,472

[72] Inventors Richard F. Brady;
Jean C. Johnson, Muncie, Indiana
[21] Appl. No. 653,068
[22] Filed July 13, 1967
[45] Patented Nov. 17, 1970
[73] Assignee By mesne assignment to
Francis E. Brady, Jr.
Muncie, Indiana

[54] CHECK VALVE
16 Claims, 5 Drawing Figs.
[52] U.S. Cl. .................................................. 137/516.29,
251/368, 137/533.21
[51] Int. Cl. ...................................................... F16k 15/06
[50] Field of Search ............................................ 137/533.21,
533.31, 533.17, 533.19, 533.23, 536, 543,
515—515.7, 516.29, 542, 543.13, 218; 251/332,
333, 368, 114B; 260/67FP

[56] References Cited
UNITED STATES PATENTS
1,767,538  6/1930  Mahan ........................ 137/515.3
2,909,192  10/1959 Dobrick ....................... 137/542
3,202,178  8/1965  Wolfe .......................... 137/516.29
1,990,557  2/1935  Melott ......................... 251/332
2,061,480  11/1936 Pigott .......................... 137/533.21
2,226,972  12/1940 Greve .......................... 137/533.23
2,232,739  2/1941  Sharp et al. ................... 137/533.31X
2,307,546  1/1943  Shimer ........................ 251/333X
2,827,922  3/1958  Guinard ....................... 137/533.21
3,176,876  4/1965  Fischer et al. ................. 251/368X
3,180,352  4/1965  Kersten et al. ................. 137/218
3,185,179  5/1965  Harautoneian ................. 251/368X
3,351,081  11/1967 Bogossian et al. .............. 251/332X FOREIGN PATENTS
1,151,138  1957  France ......................... 137/533.21

OTHER REFERENCES
Modern Plastics Encylcopedia, 1965, Vol. 42 No. 1A, Mc-
graw-Hill, pages 113— 116 and page 10 of chart opposite
page 132. TP 986. A2M5

Primary Examiner—William F. O'Dea
Assistant Examiner—Richard Gerard
Attorney—Woodard, Weikart, Emhardt and Naughton ABSTRACT: A check valve including a generally cylindrical housing of low-friction plastic molded with a conical seat and streamlined entry and departure regions adjacent thereto in a passageway from entrance to exit ends of the housing. A low-friction molded plastic ogive-shaped diffuser body downstream of the seat, with internal longitudinally extending tapered-edged guide flutes receiving a tapered stem of a molded low-friction plastic valve including a circular flange, flexible seal, and conical seating face upstream of the flange and seal. The taper and clearance of the guide flutes and valve stem accommodating self-centering of the valve on the seat, but aligning the flange and diffuser end for flush-fitting in the valve-open state for minimal flow restriction.

Patented Nov. 17, 1970

3,540,472

INVENTORS
RICHARD F. BRADY and
JEAN C. JOHNSON
BY
Woodard, Weikart, Emhardt & Naughton
Attorneys INVENTORS.
RICHARD F. BRADY
and JEAN C. JOHNSON
BY
Woodard, Weikart, Emhardt & Naughton
Attorneys

CHECK VALVE

BACKGROUND OF THE INVENTION

1. Field of the Invention

This invention relates generally to valves particularly useful in water systems handling untreated water with utmost reliability, minimal flow resistance and a long useful life.

2. Description of the Prior Art

Varieties of check valves are known. Where employed in water systems, to handle untreated water, commonly known as "hard" water, corrosion, pitting, and incrustation have caused various problems including minor malfunctions as well as complete failures of the valve to either open or close properly. Efforts to solve such problems have included design and material changes. However, it has been found difficult to make design changes without materially deteriorating the flow characteristics of the valve. Also, material changes sometimes seem to dictate design changes detrimental to flow characteristics. One check valve which was an improvement over prior art in several respects is shown in U.S. Pat. No. 2,827,922 issued Mar. 25, 1958 to Guinard.

SUMMARY

Described briefly, in a typical embodiment of the present invention, a housing of a comparatively strong and durable but low-friction plastic is molded with a streamlined passageway therein both upstream and downstream of a conical valve seat molded therein. A valve disk is provided including a conical seating surface and a circular groove downstream of the surface and receiving a flexible seal sealingly engageable with the conical seat surface immediately above the conical valve disk face.

A streamlined diffuser is mounted in the passageway downstream of the disk and includes tapered longitudinally extending guide flutes receiving a tapered guide stem on the disk, for accommodating self-centering of the disk on the seat to facilitate closure of the valve, and yet closely aligning the disk with the diffuser upstream end when the valve is opened, the seal and disk being so dimensioned as to provide a virtually flush continuous surface with the diffuser when the valve is opened, thus minimizing and virtually eliminating flow disturbance while the valve is opened. The diffuser, disk and stem are molded of the same material as the housing.

DESCRIPTION OF THE PREFERRED EMBODIMENT

Figure 1:
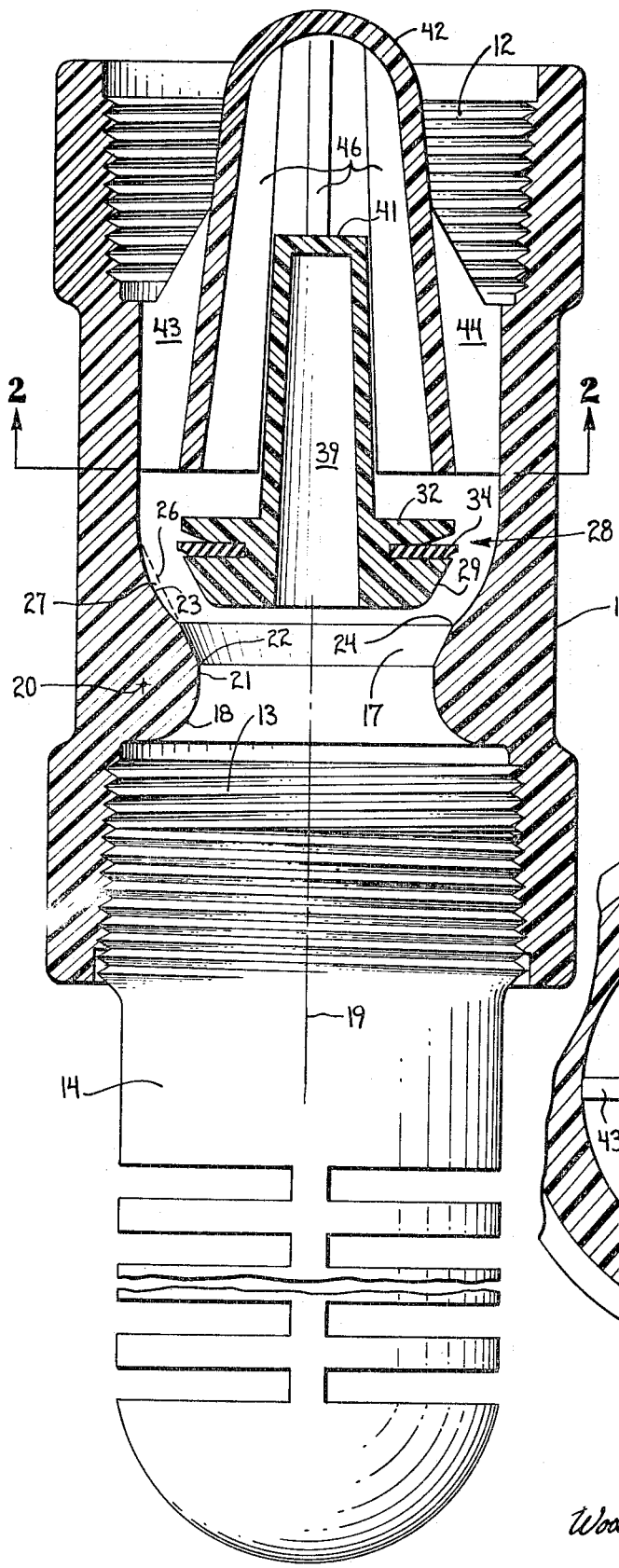
FIG. 1 is a longitudinal sectional view of the assembly taken on a plane containing the longitudinal axis thereof, and showing the disk in a position intermediate the fully-opened and fully-closed positions.
Figure 2:
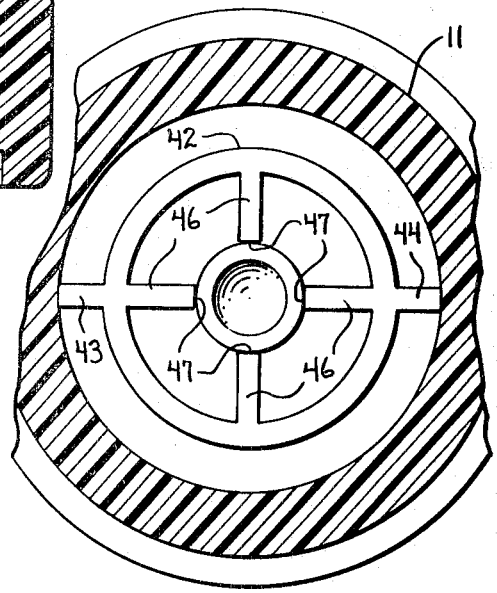
FIG. 2 is a section taken at line 2-2 in FIG. 1 and viewed in the direction of the arrows, illustrating a guide flute arrangement.

Referring now to the drawings in detail, the housing 11 is formed of a molded low-friction, hard and strong water-lubricated plastic material. An acetal such as Delrin No. 107 furnished by the DuPont Company has been found very satisfactory for this purpose. Various sizes can be provided depending on flow and piping requirements, and the embodiment illustrated might be threaded at the upper end at 12 to receive a 1¼-inch pipe, while the lower end is interiorly threaded likewise to receive a suitable pipe or the upper end of a suitable intake strainer 14. The flow direction is upward in the direction of the arrow 16 and the assembly is constructed for minimal resistance to flow in that direction.

According to one feature of the invention a conical surface 17 is molded into the passageway in such a manner as to avoid any detrimental effect on flow characteristics and yet establish excellent seating, nonsticking, and endurance characteristics. Because flow is upward in the illustrated embodiment, a region below the valve seat 17 and which is upstream therefrom will be referred to as the "entry" region, and a region above the seat and downstream therefrom will be referred to herein as the "departure" region. In the particular embodiment illustrated in the drawings herein, the entry region includes a surface 18 of progressively decreasing diameter with respect to axis 19 at points on the surface closer to the valve seat. This surface 18 can be formed by rotating around axis 19 a circle having its center at 20 so that the surface 18 becomes the surface of revolution of a circle and the conical surface 17 can be a chord of that circle. A conical seat of this nature has been found quite acceptable even in instances where a short length of straight cylindrical entry is provided at 21 between surface 18 and the entry edge of the surface 17 at 22. The departure region includes the surface 23 which may conveniently be a blend of several circles of revolution if desired, the portion immediately downstream of the edge 24 of the seat being of greater diameter than it would be if the conical surface were extended as indicated by dotted outline 26, and thus providing a much improved flow characteristic through the valve assembly. Thus the progressive increase of diameter of the surface 23 immediately downstream of the surface 17 is at a rate greater than that of increase in diameter of the conical surface and provides the annular relief region 27 downstream of the conical seat.

Figure 3:
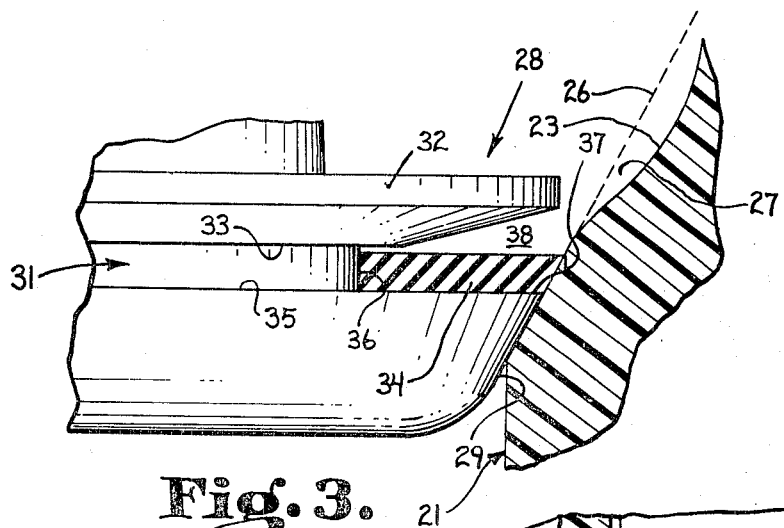
FIG. 3 is an enlarged fragmentary longitudinal sectional view showing the disk in fully-closed position and illustrating the extent to which the seal diameter tends to exceed that of the conical seat surface at a horizontal plane level with the upper face of the seal.
Figure 4:
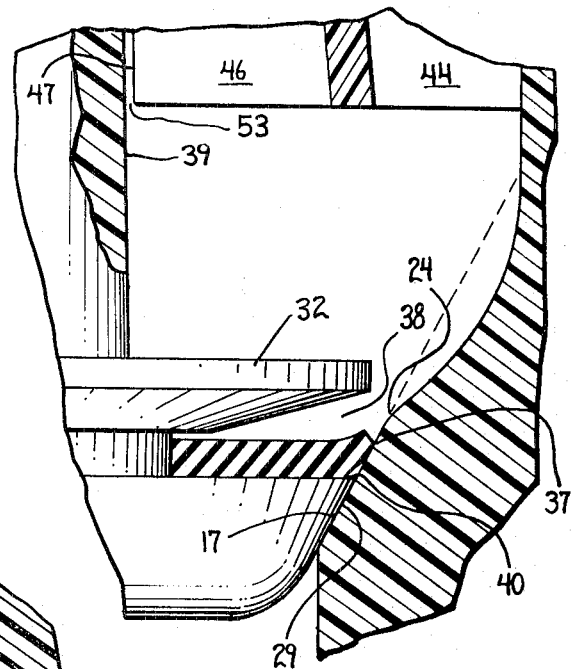
FIG. 4 is a section like FIG. 3 illustrating the configuration which can be assumed by the seal with the disk in fully-closed position.

A valve disk 28 is provided with a conical face 29, annular groove 31 and radially extending flange 32, the groove width between walls 35 and 33 slightly exceeding the thickness of the seal 34 received in the groove, the diameter of the groove bottom 36 slightly exceeding the internal diameter of the aperture in the seal so that the seal is snug on the disk. The outside diameter of the seal is selected such that its peripheral edge 37 will seal against the conical surface 17 as shown in FIG. 4, and, as illustrated in FIG. 3, the free diameter is somewhat larger than the diameter of the surface 17 where the seal contacts, thus effecting the slight upward curving of the seal at its periphery (FIG. 4) assuring a complete seal around the periphery. To accommodate this curvature and avoid pinching of the seal, the downstream wall of the seal groove is chamfered to provide a seal relief area 38 which is used as shown in FIG. 4. Moreover, because of the concave annular chamfer 45 in the seal between seal edges 37 and 40, with bottom edge 40 always radially inward of the cone of face 29, and recessed with respect to the disk annular edge 55 at the intersection of seating face 29 and seal support face 35, edge 40 never contacts the conical seat. The chamfer thereby facilitates the upward curvature of the seal adjacent its edge, and avoids any seal wedging or extrusion at the seat by back pressure upon or after closure, assuring that the seal will not cause the valve to stick closed, even after it has remained closed for prolonged periods. A material typically employed for the seal is Buna N.

As shown in FIG. 4, the valve disk is seated well down into the seat, as might occur if the disk and seat were on the low and high sides respectively of their tolerances. In this case, the sealing edge 37 seals on the conical seat well below the upper edge 24 thereof. The length of the seat 17 between edges 22 and 24 is great enough that even if the disk and seat are on the high and low sides, respectively, of their tolerance, edge 37 still seals on seat 17 and not on surface 23. Accordingly the seal diameter at edge 37 can be minimized, since it will never need to reach surface 23, which diverges rapidly compared to seat 17. Minimizing the diameter of seal edge 37, minimizes turbulence loss.

Figure 5:
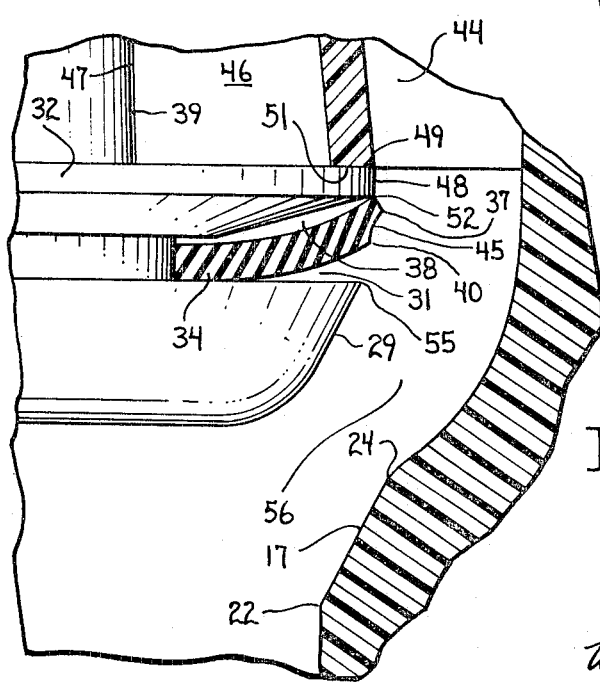
FIG. 5 is a section like FIG. 4 but showing the disk in fully-opened position.

To guide the valve from a partially opened condition of FIG. 1, for example, to the maximum open condition of FIG. 5, a stem 39 is provided, and this is conveniently molded as a single piece with the disk in the same material as the housing 11. The stem is tapered from a larger diameter near the flange 32 to a smaller diameter at its upper end 41. This stem is received in a diffuser 42 mounted in the housing coaxial therewith by a pair of support ribs 43 and 44. This diffuser is somewhat teardrop or ogive-shaped and is hollow, containing a set of longitudinally extending flutes 46 projecting radially inwardly toward axis 19 and, therefore, toward the stem 39. The inner marginal edges 47 of these flutes facing the stem are tapered in the same direction and to the same degree as is the stem. The taper of the stem and flutes, and the radial spacing between the stem and flutes when the valve is open are such that the peripheral edge 48 of the flange 32 is perfectly aligned and flush with the periphery 49 of the diffuser at its lower marginal edge 51 abutted by the upper face of the flange (FIG. 5), thus limiting downstream movement of the valve disk when the valve opens. Accordingly there is no restriction to flow past this juncture. Similarly, the relief 38 at the upstream wall of the seal groove permits flexure of the seal to the position shown in FIG. 5 wherein its periphery is flush with the periphery of the flange as at 52. Although there is virtually no clearance between the stem 39 and flute edges 47 when the valve disk is in this maximum-open condition, the taper effects an increased spacing as the valve moves upstream during closure, and the rate of increase is small enough to continue guiding the stem and disk so that the conical face 29 of the valve disk properly approaches and becomes adjacent the conical surface 17 of the valve seat. Yet, when the disk nears seated position (FIG. 4), the clearance is sufficient, as indicated at 53, that the disk is self-centering by cooperation of the face 29 with the seat 17, without impediment by the guide flutes and stem. It has been found that with use of the above mentioned acetal material for the stem, disk, diffuser, flutes and housing, a vertex angle for the cone of the seat 17 not less than 36° nor more than 56° is desirable. The minimum angle used depends upon the working temperature and pressure of the valve. As the temperature and pressure increase the angle must increase to prevent the valve from wedging closed. At four days exposure to 150 p.s.i.g. the following formula expresses a temperature-minimum angle relationship useful to prevent sticking:

$$T = \left(\frac{A - 8.2}{30}\right) \times 86$$

where T = degrees Fahrenheit
and A = degrees of angle useful to prevent sticking at T° Fahrenheit.

At angles above 50° the flow friction losses of the valve begin to increase greatly. Thus an angle in the order of 50° seems optimum to avoid sticking regardless of temperature within desired operating range, pressure, and duration of closure, and yet provide good flow and wear characteristics and long life. With a seat having this included angle, an included angle of the cone of the valve disk on the order of 54° serves very well. Naturally if the operating environment for a valve is such as to assure that it will never be exposed to heat or sunlight, but instead a comparatively low operating temperature will always be the case, such as in a foot valve, for example, an angle of even less than 36° might be used.

A taper angle of approximately 1° serves very well for the stem and flutes in a valve having substantially constant-velocity flow characteristics in the area 56 of FIG. 5 during full-open operation. Because of the self-centering feature of the combination, it is possible that some uses of the valve may be made without a flexible seal. Here again, the 50° angle may be the optimum, and the seat and disc may be machined and lapped together, rather than merely used as they come from a mold.

Another feature of the present invention is the fact that the valve need not be spring loaded, nor does it rely on weight of the check device for closure. Accordingly the valve of the present invention can be operated satisfactorily in any attitude and even if inverted from the attitude shown in FIG. 1. A very slight reversal of flow therethrough, as can occur when the pump stops operating and pressure in the system tends to reverse flow, is effective to seat and close the valve. It seems desirable, therefore, that for best all-around utility, the density of the disk and stem and seal assembly be approximately that of water, with a specific gravity not exceeding 1.5. The actual specific gravity in a working example is less than 1.5. As mentioned above, it is desirable that the material used be a comparatively strong and durable molded plastic. A particular advantage of the acetal material mentioned above is the fact that water serves as a lubricant for it and, while it has a low coefficient of friction of the order of .3 when dry, the coefficient of friction in water is less than .2. Moreover, by providing a smooth surface finish of 4 (root mean square) maximum on the cones of the disk and seat, in water the effect of a coefficient of friction nearer .1 than .2 seems to be obtained. The acetal material has excellent resistance to creep under stress as well as excellent resistance to chemicals and to incrustation.

While the invention has been disclosed and described in some detail in the drawings and foregoing description, they are to be considered as illustrative and not restrictive in character, as other modifications may readily suggest themselves to persons skilled in this art.

We claim:
1. A check valve comprising:
   a housing having a passageway therethrough with an entrance and an exit and a valve seat portion therein between said entrance and exit, said valve seat portion including a conical surface of diameters progressively increasing in a downstream direction, said housing having an entry region upstream of said surface and of progressively decreasing diameter toward said surface, and said housing having a departure region of progressively increasing diameter at progressively greater distances downstream from said surface;
   a valve disk in said housing and having a conical face thereon and movable from a valve-open position spaced from said conical surface to a valve-closed position fittingly received in, directly contacting, and supported by said conical surface of said housing;
   a flexible seal mounted on said disk and sealing against said disk and said seat portion when said disk is supported by said conical surface;
   said valve disk being free of spring bias and having an elongated stem with first tapered guide means thereon defining a first set of tapering guide lines, and said valve housing having second tapered guide means receiving said stem and providing a second set of tapered guide lines; and
   said first guide means being engageable with said second guide means along said tapering guide lines and confining said disk laterally to maintain registry of said conical face thereof with said conical surface of said valve seat when said disk is separated from said conical surface, the tapers of said first and second guide means accommodating limited lateral movement of said disk within said conical surface when said disk is near said conical surface to enable self-centering of said conical face against said conical surface during closure and seating of said disk on said seat portion.

2. The valve of claim 1 wherein: said first guide means include a stem mounted on said disk, the combination of said disk and stem and seal having a density substantially equal to the density of water.

3. A check valve comprising:
   a housing having a passageway therethrough with an entrance and an exit and a valve seat portion therein between said entrance and exit, said valve seat portion including a conical surface of diameters progressively increasing in a downstream direction, said housing having an entry region upstream of said surface and of progressively decreasing diameter toward said surface, and said housing having a departure region of progressively increasing diameter at progressively greater distances downstream from said surface;

a valve disk in said housing and having a conical face thereon and movable from a valve-open position spaced from said conical surface to a valve-closed position fittingly received in, directly contacting, and supported by said conical surface of said housing;

a flexible seal mounted on said disk and sealing against said disk and said seat portion when said disk is supported by said conical surface;

diffuser means in said passageway downstream of said seat portion, said diffuser means including a body mounted to said housing and having a plurality of longitudinally extending flutes therein projecting inwardly toward a longitudinal axis of said diffuser means; and said disk having a stem extending therefrom into said diffuser body, said flutes having guide surfaces facing said stem, there being radial spacing between said surfaces and said stem such that axial movement of said disk from valve-closed to valve-open position reduces the space from a maximum permitting self-centering of said conical face on said conical surface when said disk is near valve-closed position, to a minimum aligning said disk with said diffuser for minimal flow restriction in the maximum valve-open condition.

4. The valve of claim 3 wherein: the material of said flutes and said stem is substantially immune to incrustation and pitting in hard water, said material has a low coefficient of friction, and the density of the combination of said disk and stem and seal is substantially equal to that of water.

5. The valve of claim 3 wherein:
said diffuser is ogive-shaped externally; and
said guide surfaces of said flutes are tapered guiding edges, and said stem is tapered.

6. The valve of claim 5 wherein:
said diffuser has a substantially circular upstream marginal edge and;
said disk has a radially extending circular flange downstream from said seal;
said flange being disposed in abutting relationship with said marginal edge in the said maximum valve-open condition, thus limiting downstream travel of said disk during opening of said valve; and
the periphery of said flange being flush with the periphery of said diffuser at the location of abutment therebetween.

7. A check valve comprising:
a housing having a passageway therethrough with an entrance and an exit and a valve seat portion therein between said entrance and exit;
said housing having a seat entry region upstream of said seat portion and of progressively decreasing diameter toward said seat portion, and said housing having a departure region of progressively increasing diameter at progressively greater distances downstream from said seat portion;
a valve disk in said housing and having a seating surface thereon, said disk being movable from a valve-open position spaced from said seat portion, to a valve-closed position wherein said seating surface is seated and supported on said valve seat portion of said housing, said disk having a seal-receiving annular groove therein;
and a flexible seal mounted in said groove on said disk and sealing against said disk and said seat portion when said disk is supported by said seat portion;
the axial dimension of said groove at the periphery of said disk exceeding the axial dimension of said seal at the periphery of said seal to accommodate conformity of said seal to said seat portion without pinching thereof by said disk upon approach and attainment of valve-closed position by said disk;

said seal being sufficiently flexible for flexing to a condition of contact thereof with the downstream wall of said groove near the periphery of said wall by water flow when said disk is moved to valve-open position by water flow through said passageway; and
the outside diameters of said downstream wall and said seal at their peripheries being substantially equal to establish a substantially flush condition of said seal and wall peripheries during said condition of contact to minimize flow interferences thereby.

8. A check valve comprising:
a housing having a passageway therethrough with an entrance and an exit and a valve seat portion therein between said entrance and exit, said valve seat portion including a conical surface, said housing having an entry region upstream of said surface and a departure region downstream from said surface;
a valve disk in said housing and having a conical face thereon and movable from a valve-opened position spaced from said surface to a valve-closed position fittingly received in and supported by said conical surface of said housing;
a body in said housing downstream of said seat portion and having first guide means providing longitudinally extending guidelines in said body tapering inwardly toward a longitudinal axis of said body; and
said disk having second guide means thereon providing longitudinally extending guidelines tapering inwardly toward said axis and cooperating with said first guide means for precise lateral location of said disk in said passageway when said disk is separated a maximum extent from said conical surface, and for continuing to confine said disk laterally to maintain registry of said conical face thereof with said conical surface of said valve seat but with decreasing precision as said disk approaches said conical surface, said first and second guide means accommodating limited lateral movement of said disc within said conical surface to enable self-centering of said conical face against said conical surface during closure and seating of said disk on said seat portion.

9. The combination of claim 8 and further comprising:
a peripheral groove in said disk, said groove having an upstream face extending radially outward to said conical face; and
a flexible seal received in said groove, said seal having an upstream face supported by said upstream face of said disk, said seal having a peripheral sealing edge sealing against said conical surface of said housing.

10. The combination of claim 9 wherein: said conical face and conical surface are of dimensions avoiding the engagement of said seal with any portion of said housing other than said conical surface.

11. The combination of claim 8 wherein: said conical surface has a vertex angle between 36° and 56°.

12. The combination of claim 11 wherein: said vertex angle is substantially equal to 50°.

13. A check valve comprising:
a housing having a passageway therethrough with an entrance and an exit and a valve seat portion therein between said entrance and exit, said valve seat portion including a conical surface, said housing having an entry region upstream of said surface and a departure region downstream from said surface;
a valve disk in said housing and having a conical face thereon and movable from a valve-opened position spaced from said surface to a valve-closed position fittingly received in and supported by said conical surface of said housing;
first guide means associated with said disk for location thereof when said disk is separated from said conical surface, said first guide means confining said disk laterally to maintain registry of said conical face thereof with said conical surface of said valve seat, said first guide means accommodating limited lateral movement of said disk within said conical surface to enable self-centering of said conical face against said conical surface during closure and seating of said disk on said seat portion;

a body mounted to said housing downstream of said seat portion and having a plurality of longitudinally extending flutes therein projecting inwardly toward a longitudinal axis of said body; and said disk having a stem extending therefrom into said body, said flutes being guidingly associated with said stem and having tapered guiding edges thereon facing said stem, said stem being tapered, the radial spacing between said edges and said stem being such that axial movement of said disk from valve-close to valve-open position reduces the space from a maximum permitting self-centering of said conical face on said conical surface when said disk is near valve-closed position, to a minimum aligning said disk with said body for minimal flow restriction in the maximum valve-open condition.

14. A check valve comprising:

a housing having a passageway therethrough with an entrance and an exit and a valve seat portion therein between said entrance and exit, said valve seat portion including a conical surface, said housing having an entry region upstream of said surface and a departure region downstream from said surface;

a valve disk in said housing and having a conical face thereon and movable from a valve-opened position spaced from said surface to a valve-closed position fittingly received in and supported by said conical surface of said housing;

first guide means associated with said disk for location thereof when said disk is separated from said conical surface, said first guide means confining said disk laterally to maintain registry of said conical face thereof with said conical surface of said valve seat, said first guide means accommodating limited lateral movement of said disk within said conical surface to enable self-centering of said conical face against said conical surface during closure and seating of said disk on said seat portion;

a peripheral groove in said disk, said groove having an upstream face extending radially outward to said conical face;

a flexible seal received in said groove, said seal having an upstream face supported by said upstream face of said disk, said seal having a peripheral sealing edge sealing against said conical surface of said housing; and said seal having a chamfered annular margin extending from said peripheral sealing edge to said upstream face of said seal, the intersection of said margin and upstream face being recessed inwardly from said conical face to avoid extrusion and wedging of said seal between said conical face of said disk and said conical surface of said housing.

15. A check valve comprising:

a housing having a passageway therethrough with an entrance and an exit and a valve seat portion therein between said entrance and exit;

said housing having a seat entry region upstream of said seat portion and a departure region downstream of said seat portion;

a valve disk in said housing and having a seating surface thereon, said disk being movable from a valve-open position spaced from said seat portion, to a valve-closed position wherein said seating surface is seated and supported on said valve seat portion of said housing, said disk having a seal-receiving annular groove therein;

a flexible seal mounted in said groove on said disk and sealing against said disk and said seat portion when said disk is supported by said seat portion;

said groove having an upstream seal-supporting face intersecting said seating surface in a circular edge, said seal having an upstream face resting on and supported by said seal supporting face when said disk is in said valve-closed position; and said seal having a chamfered upstream margin between the periphery of said seal and the said upstream face of said seal whereby the intersection of said margin and said upstream seal face is recessed with respect to said circular edge of said disk, avoiding wedging and extrusion of said seal when said disk is in said valve-closed position.

16. A check valve comprising:

a housing having a passageway therethrough with an entrance and an exit and a valve seat portion therein between said entrance and exit, said valve seat portion including a conical surface, said housing having an entry region upstream of said surface and a departure region downstream from said surface;

a valve disk in said housing and having a conical face thereon and movable from a valve-opened position spaced from said surface to a valve-closed position fittingly received in and supported by said conical surface of said housing;

first guide means associated with said disk and shaped for precise lateral location of said disk in said passageway when said disk is separated a maximum extent from said conical surface, and for continuing to confine said disk laterally to maintain registry of said conical face thereof with said conical surface of said valve seat but with decreasing precision as said disk approaches said conical surface, said first guide means accommodating limited lateral movement of said disk within said conical surface to enable self-centering of said conical face against said conical surface during closure and seating of said disk on said seat portion; and said conical surface having a vertex angle according to the formula:

$$T = \left(\frac{A-8.2}{30}\right) \times 86$$

where T is maximum operating temperature in degrees Fahrenheit and A is the vertex angle in degrees.